US010516978B1

(12) United States Patent
Ahluwalia et al.

(10) Patent No.: US 10,516,978 B1
(45) Date of Patent: Dec. 24, 2019

(54) NETWORK BASED CARRIER MANAGED LONG-TERM EVOLUTION ADVANCED DEVICE INDICATION FOR LONG-TERM EVOLUTION OR OTHER NEXT GENERATION NETWORK

(71) Applicant: AT&T Intellectual Property I, L.P., Atlanta, GA (US)

(72) Inventors: Inderpreet Ahluwalia, Austin, TX (US); Sashikala Dalvie, Vestal, NY (US); Jiansong Wang, Lincroft, NJ (US); Donald Hjort, Issaquah, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/179,238

(22) Filed: Nov. 2, 2018

Related U.S. Application Data

(60) Provisional application No. 62/738,525, filed on Sep. 28, 2018, provisional application No. 62/725,513, filed on Aug. 31, 2018.

(51) Int. Cl.
*H04W 4/00* (2018.01)
*H04M 1/725* (2006.01)
(Continued)

(52) U.S. Cl.
CPC ......... *H04W 4/20* (2013.01); *H04M 1/72519* (2013.01); *H04W 8/20* (2013.01); *H04W 48/16* (2013.01)

(58) Field of Classification Search
CPC .......... H04W 4/00; H04W 4/20; H04W 8/20; H04W 48/16; H04W 48/20; H04M 1/72519
(Continued)

(56) References Cited

U.S. PATENT DOCUMENTS 8,306,518 B1 11/2012 Gailloux et al.
8,408,474 B2 4/2013 Dong
(Continued)

FOREIGN PATENT DOCUMENTS

EP 1281284 A2 2/2007
GB 2514365 A * 11/2014 ............. H04W 4/16
(Continued)

OTHER PUBLICATIONS

"Khan. ""Improving Security and Privacy in Current Mobile Systems. "" Royal Holloway, Univ. of London (2017). 230 pages. https://pure.royalholloway.ac.uk/portal/files/28843005/201 7khanmphd.pdf".

*Primary Examiner* — Lee Nguyen
(74) *Attorney, Agent, or Firm* — Amin, Turocy & Watson, LLP

(57) ABSTRACT

Tracking areas that comprise service cells capable of providing advanced long-term evolution (LTE-A) features, can be utilized to indicate to a mobile device that the mobile device can access the advanced features. For example, an LTE-A capable mobile device can display an LTE-A icon if the mobile device is in a geographic area that qualifies as an LTE-A tracking area. However, if the mobile device is not capable of receiving LTE-A services, then the mobile device can display an LTE icon instead of an LTE-A icon.

20 Claims, 12 Drawing Sheets

(51) Int. Cl.
*H04W 4/20* (2018.01)
*H04W 8/20* (2009.01)
*H04W 48/16* (2009.01)

(58) Field of Classification Search
USPC ........................................................ 455/566
See application file for complete search history.

(56) References Cited

U.S. PATENT DOCUMENTS

| | | |
|---|---|---|
| 8,472,956 B2 | 6/2013 | Wang et al. |
| 8,489,143 B2 | 7/2013 | Dong |
| 8,761,832 B2 | 6/2014 | Jeung |
| 9,113,318 B2 | 8/2015 | Korkiakoski et al. |
| 9,155,105 B2 | 10/2015 | Hsu |
| 9,380,630 B2 | 6/2016 | Youtz et al. |
| 9,414,220 B2 | 8/2016 | Lee et al. |
| 9,425,946 B2 | 8/2016 | Pourahmadi et al. |
| 9,603,189 B2 | 3/2017 | Holtmanns et al. |
| 9,658,979 B2 | 5/2017 | Sekuru et al. |
| 9,713,083 B2 | 7/2017 | Toskala et al. |
| 9,717,063 B2 | 7/2017 | Ali et al. |
| 9,843,585 B2 | 12/2017 | Haggerty et al. |
| 9,967,851 B2 | 5/2018 | Cormier et al. |
| 2002/0065067 A1 | 5/2002 | Khare et al. |
| 2006/0025115 A1 | 2/2006 | Roy |
| 2011/0002267 A1 | 1/2011 | Dwyer et al. |
| 2011/0159893 A1 | 6/2011 | Siomina et al. |
| 2011/0277041 A1 | 11/2011 | Dong |
| 2017/0150341 A1 | 5/2017 | Manalo et al. |
| 2018/0242229 A1 | 8/2018 | Ahluwalia |

FOREIGN PATENT DOCUMENTS

| | | |
|---|---|---|
| WO | 2000062573 A1 | 10/2000 |
| WO | 2018162510 | 9/2018 |

* cited by examiner

NETWORK BASED CARRIER MANAGED LONG-TERM EVOLUTION ADVANCED DEVICE INDICATION FOR LONG-TERM EVOLUTION OR OTHER NEXT GENERATION NETWORK

RELATED APPLICATION

This application is a U.S. Non-Provisional Patent Application that claims the benefit of priority to each of U.S. Provisional Patent Application No. 62/738,525, filed Sep. 28, 2018 and titled "CARRIER MANAGED LONG-TERM EVOLUTION ADVANCED DEVICE INDICATION FOR LONG-TERM EVOLUTION OR OTHER NEXT GENERATION NETWORK," and U.S. Provisional Patent Application No. 62/725,513, filed Aug. 31, 2018 and titled "CARRIER MANAGED LONG-TERM EVOLUTION ADVANCED DEVICE INDICATION FOR LONG-TERM EVOLUTION OR OTHER NEXT GENERATION NETWORK," the entirety of the foregoing applications are hereby incorporated herein by reference.

TECHNICAL FIELD

This disclosure relates generally to facilitating an icon update for a mobile device. For example, this disclosure relates to facilitating an icon update for a mobile device based on service areas and mobile device types for advanced feature functionality, or a subset thereof, for a long-term evolution, or other next generation network.

BACKGROUND

In telecommunication, long-term evolution (LTE) is a standard for high-speed wireless communication for mobile devices and data terminals. It increases the capacity and speed of the network by using a different radio interface together with core network improvements. The standard is developed by the 3rd generation partnership project (3GPP). The different LTE frequencies and bands used in different jurisdictions/countries mean that only multi-band phones are able to use LTE in all jurisdictions/countries where it is supported.

The above-described background relating to facilitating an icon update for a mobile device is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
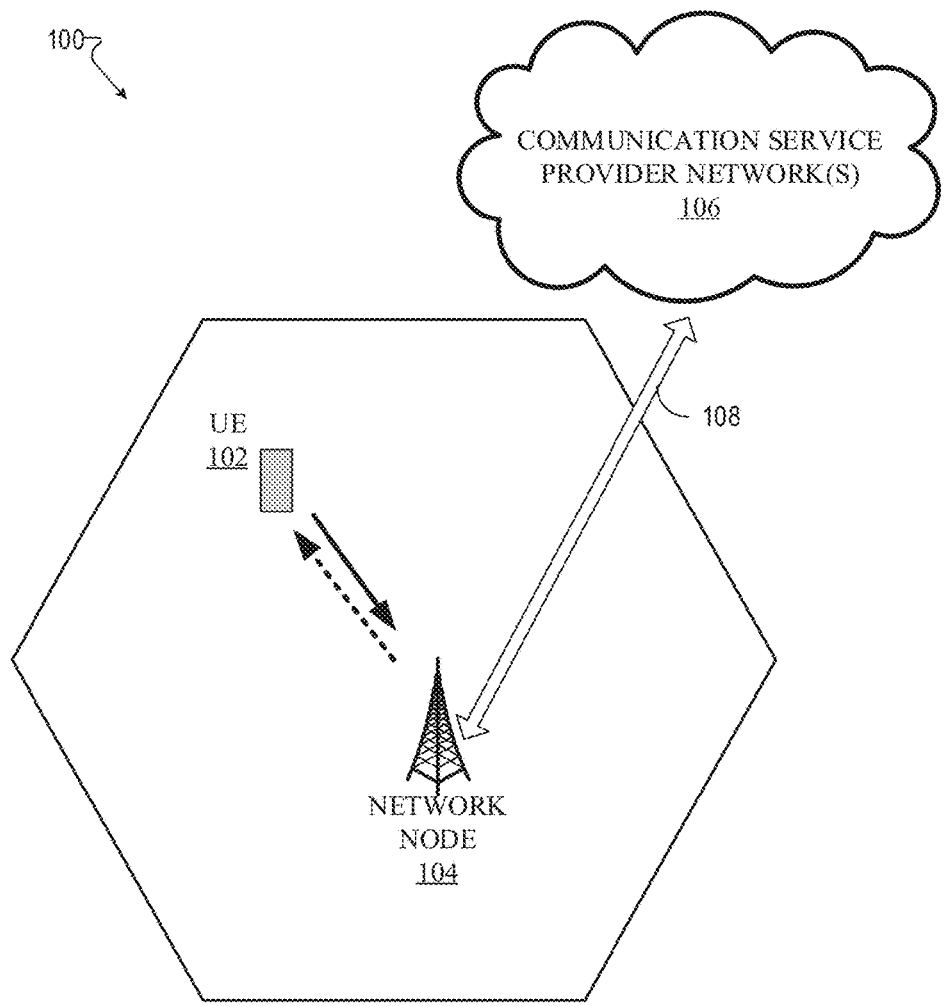
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate an icon update for a mobile device for a long-term evolution (LTE) air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate an icon update for a mobile device for an LTE network. Facilitating an icon update for a mobile device for a LTE network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used, but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments, the non-limiting term radio network node or simply network node is used. It can refer to any type of network node that serves UE and is connected to other network nodes or network elements or any radio node from where UE receive a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc.

Cloud radio access networks (RAN) can enable the implementation of concepts such as software-defined network (SDN) and network function virtualization (NFV) in LTE networks. Certain embodiments of this disclosure can comprise an SDN controller that can control routing of traffic within the network and between the network and traffic destinations. The SDN controller can be merged with the LTE network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

LTE advanced (LTE-A) features can provide higher upload and download speeds to mobile devices that are capable of supporting these features. LTE-A can comprise 3GPP features such as: carrier aggregation (e.g., single carrier and multiple component carrier), 4*4 MIMO, 256 quadrature amplitude modulation (QAM) higher order modulation, and/or license assisted access (LAA). It should also be noted that LTE-A can comprise additional features not discussed in this disclosure. Currently, these features are connected mode features that can be signaled to a mobile device via a radio resource control (RRC) configuration message. Thus, there is no advance indication to the mobile device that one of more of these advance features are available for use by a subscriber who has a capable mobile device. There is no indication, in the system information messages, when a device is in idle mode, that the network or area a subscriber is in is capable of these advanced features. Additionally, when a capable mobile device is in connected mode, the use of these features can be dependent upon a number of varying conditions, such as: available network resources, coverage, amount of data being transferred, etc.

Currently, when a mobile device is streaming and/or downloading a large quantity of data (e.g., such as downloading large media files or when the mobile device is tethered to a laptop) there is no indication by the network of when the mobile device can utilize the advanced features based on a specific area. Additionally, these features cannot be deployed across the whole network at the same time, but rather, in a more staggered, controlled, approach due to deployment cost, spectrum availability, etc. The advanced features can be targeted at densely populated urban areas where data demand is high and areas such as sports venues, music concerts, mass public gatherings, ceremonies, marches, etc.

Service areas can be located in the network, where a service area contains one or more tracking areas, which can have cells that support one or more of the advanced features. Therefore, telecom entities (e.g. marketing, network, planning) can define a list of tracking area codes that can be associated with designated LTE-A service areas. The LTE-A service areas can be based on a set of configurable criteria such as: feature availability, number of capable cells, percentage of coverage, percentage of population based functions, etc. When a capable mobile device enters or exits one of these service areas (or is about to enter or exit), by way of an attach and/or tracking area updating procedure or handover procedure, the mobile device can display an icon (e.g., an LTE-A icon). The icon can be shown in both an idle mode and/or a connected mode. Although, the disclosure makes reference to an LTE-A icon, the actual icon itself can be any form of advanced service indicator.

It is also possible for an alternate approach, whereby a device original equipment manufacturer (OEM) can employ a cell or tracking area tagging crowdsourcing approach. For instance, the mobile device can contain a downloaded list of LTE-A cells and/or tracking areas. The mobile device can internally tag and/or mark a new cell or a new tracking area each time it makes use of one or more of the advanced features. The newly tagged cell and/or tracking area can then be relayed back to a central crowdsourcing server for further post processing analysis (i.e. removing duplicates and/or tracking areas that do not meet some criteria). As more mobile devices report back the new cells and/or tracking areas that they encounter, it can be possible for the crowdsourcing server to then transmit the updated list of tagged cells and/or tracking areas to the mobile devices so that the mobile devices have a new version of the cells and/or tracking areas where the mobile devices can display the LTE-A icon.

Service areas in a wireless network can be defined such that a service area can comprise one or more tracking areas, which can have cells that support one or more of the advanced features. For example, specific entities (e.g. marketing, network, planning, etc.) can define a list of tracking area codes that can be designated as "LTE-A service areas". The LTE-A service areas can be based on a set of configurable criteria including, but not limited to: feature availability, number of capable cells, percent of coverage, and/or percent of point of presence based, etc. Different types of service areas can be defined based on the types of network support. For example, in this disclosure service area types can be defined as a type-0 with no LTE advanced features, type-1 that supports a subset of LTE advanced features (e.g., contains some type-1 cells), or type-2 that supports all necessary LTE advanced features (e.g., contains primarily type-2 cells). Additionally, different device types can be defined based on a level of device support. For example, a device can be defined as a type-0 device that does not support any LTE-A features, a type-1 device that supports a subset of LTE-A features, or a type-2 device that supports all necessary LTE-A features.

When a capable UE is in, or enters, one of the service areas by way of an attach or tracking area updating procedure or handover procedure, the UE can display the "LTE-A" icon in both connected idle mode and/or connected mode. However, when the capable UE is not in, or exits, one of these service areas by way of an attach or tracking area updating procedure or handover procedure, the UE can display the "LTE" icon in both connected idle mode and/or connected mode.

The aforementioned process can utilize aspects from 3GPP including, but not limited to the fact that a subscriber identity module (SIM) based name can be a higher priority than a network based name, or utilize a wireless operator that has the ability to send its network name to devices by way of an evolved universal terrestrial radio access network mobility management (EMM) information message/element (IE) during registration procedures (attach and tracking area updates). Additionally, the wireless carrier can configure their MME to send an international mobile subscriber identity (IMSI) number series based network name to the mobile device.

The MME can send indications to the mobile device based on the type of tracking area, which is ultimately based on the type and the number of the cells within the tracking area. The type can be determined during idle mode and/or connected mode. The MME can send the indications on a pro-IMSI number series basis. For example, the indicators can be sent based on subscriber types (e.g., to AT&T subscribers). However, roamers or other inbound devices can be prevented from receiving the message. Thus, the system can control the types of devices the messages are sent to. It should be noted that the cell sites can have one or more associated tracking areas based on the cell sites public land mobile network (PLMN). Therefore, a customized message name can be sent to the mobile device during the attachment/handover process.

TABLE 1

ENTERPRISE MOBILITY MANAGEMENT (EMM) INFORMATION MESSAGE CONTENT

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | EMM information message identity | Message type 9.8 | M | V | 1 |
| 43 | Full name for network | Network name 9.9.3.24 | O | TLV | 3-n |
| 45 | Short name for network | Network name 9.9.3.24 | O | TLV | 3-n |
| 46 | Local time zone | Time zone 9.9.3.29 | O | TV | 2 |
| 47 | Universal time and local time zone | Time zone and time 9.9.3.30 | O | TV | 8 |
| 49 | Network daylight saving time | Daylight saving time 9.9.3.6 | O | TLV | 3 |

The IE can be sent by the network to indicate the full length name of the network and that the network requests the UE to associate with the mobile country code (MCC) and mobile network code (MNC) contained in the last visited tracking area identification. The IE can also indicate an abbreviated name of the network and that the network requests the UE to associate with the MCC and mobile network code (MNC) contained in the last visited tracking area identification. The network name can be a type 4 information element with a minimum length of 3 octets. No upper length limit is specified except for that given by the maximum number of octets in a L3 message.

TABLE 2

Network Name Information Element (IE)

| 8 | 7 | 6 | 5 | 4 | 3 | 2 | 1 | |
|---|---|---|---|---|---|---|---|---|
| | | | Network Name IEI | | | | | octet 1 |
| | | | Length of Network Name contents | | | | | octet 2 |
| ext 1 | | coding scheme | | Add CI | Number of spare bits in last octet | | | octet 3 |
| | | | Text String | | | | | octet 4 |
| | | | | | | | | octet n |

TABLE 3

Network Name Information Element

Number of spare bits in last octet (octet 3, bits 1 to 3)
2 1
0 0 1  bit 8 is spare and set to "0" in octet n
0 1 0  bits 7 and 8 are spare and set to "0" in octet n
0 1 1  bits 6 to 8(inclusive) are spare and set to "0" in octet n
1 0 0  bits 5 to 8(inclusive) are spare and set to "0" in octet n
1 0 1  bits 4 to 8(inclusive) are spare and set to "0" in octet n
1 1 0  bits 3 to 8(inclusive) are spare and set to "0" in octet n
1 1 1  bits 2 to 8(inclusive) are spare and set to "0" in octet n
0 0 0  this field carries no information about the number of spare bits in octet n
Add CI (octet 3, bit 4)
0  The MS should not add the letters for the Country's Initials to the text string
1  The MS should add the letters for the Country's Initials and a separator (e.g. a space) to the text string
Coding Scheme (octet 3, bits 5-7)
0 0 0  Cell Broadcast data coding scheme, GSM default alphabet, language unspecified, defined in 3GPP TS 23.038 [8b]
0 0 1  UCS2 (16 bit) [72]
0 1 0
to  reserved
1 1 1
Text String (octet 4 to octet n, inclusive)
Encoded according to the coding scheme defined by octet 3, bits 5-7

A type of tracking area code (TAC) indicator (e.g., "TYPE OF TAC INDICATOR") can be used in the network name IE, which the mobile device can use to determine the type of tracking area that it is currently being served by. The mobile device can then use this information to determine which icon it should display to the user. If the full name for the network and/or the short name for the network IE's are not present in the EMM information message, then the mobile device can default to displaying its default icon (i.e. "4G LTE"). If the full name for the network and/or the short name for the network IE's are present in the EMM information message, and if the type of TAC indicator is not present, then the device can default to displaying its default icon (e.g., "4G LTE"). If the type of TAC indicator is present and the type of TAC indicator=type-1 and if the device is type-0, then the mobile device can default to displaying its default icon (i.e., "4G LTE"). If the device is type-1, then the mobile device can display the "LTE-A" icon, or if the device is type-2, then the mobile device can display the "LTE-A" icon. However, if the type of TAC indicator=type-2 and if the mobile device is type-0, then the mobile device can default to displaying its default icon (i.e., "4G LTE"). If the mobile device is type-1, then the mobile device can default to displaying its default icon (i.e., "4G LTE"), or if the mobile device is type-2, then the mobile device can display the "LTE-A" icon.

Additionally, just because a mobile device supports one of more of the features, instead of displaying the "LTE", the device can display an "LTE-A" icon irrespective of the network capabilities. This has the disadvantage of not being a controlled process as cellular deployment progresses and can give a false indication. One other approach can utilize a SIM based approach where the list of TACs for each type of service area is sent to the SIM card, which the mobile device can then read and determine if it should display the "LTE" icon or the "LTE-A" icon.

In one embodiment, described herein is a method comprising receiving, by a mobile device comprising a processor, message data from a network device of a wireless network, wherein the message data comprises tracking area data representative of a tracking area of the wireless network to which the mobile device has connected. Based on the tracking area data, the method can comprise determining, by the mobile device, a type of the tracking area. Based on the type of the tracking area, the method can comprise generating, by the mobile device, display data representative of a wireless service associated with the tracking area.

According to another embodiment, a network device can facilitate, receiving, from a mobile device of the wireless network, a request to connect to a cell of cells of a tracking area of the wireless network. Based on a characteristic of the cells of the tracking area, the network device can perform the operations comprising generating message data comprising tracking area data representative of a type of the tracking area of the wireless network, wherein the type of the tracking area is usable by the mobile device to determine content to display to indicate a level of support for an advanced capability of a wireless service. Additionally, the network device can perform the operations of sending the type of the tracking area to the mobile device.

According to yet another embodiment, described herein is a machine-readable storage medium that can perform the operations comprising receiving, by a mobile device comprising a processor, message data from a network device of a wireless network, wherein the message data comprises tracking area data comprising an indication of a tracking area of the wireless network to which the mobile device has connected. The machine-readable storage medium can perform the operations comprising determining, by the mobile device, a type of the tracking area based on the tracking area data. Additionally, based on the type of the tracking area, the machine-readable storage medium can perform the operations comprising generating, by the mobile device, display data representative of a wireless service associated with the tracking area.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE 102 can have one or more antenna panels having a vertical and/or horizontal orientation. Examples of a UE 102 comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node 104 (e.g., network node device) can communicate with user equipment (UE), thus providing connectivity between the UE 102 and the wider cellular network. The UE 102 can send transmission type recommendation data to the network node 104. The transmission type recommendation data can comprise a recommendation to transmit data via a closed loop MIMO mode and/or a rank-1 precoder mode.

A network node 104 (e.g., eNode B, base station, cell, etc.) can comprise a cabinet, other protected enclosures, an antenna mast, and/or multiple antennas for performing various transmission operations (e.g., MIMO operations). Network nodes can serve several tracking areas, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network node 104 represents an uplink (UL) communication.

System 100 can further include one or more communication service provider network(s) 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large-scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone/line, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for LTE advanced systems, the embodiments can be applicable to any radio access technology (RAT) or multi-RAT system, including 5G, where the UE operates using multiple carriers.

For example, system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi-Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech/voice is simultaneously scheduled).

In various embodiments, system 100 can be configured to provide and employ LTE advanced wireless networking features and functionalities. Performance can be improved if both the transmitter (e.g., UE) and the receiver (e.g., network node) are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain.

Figure 2:
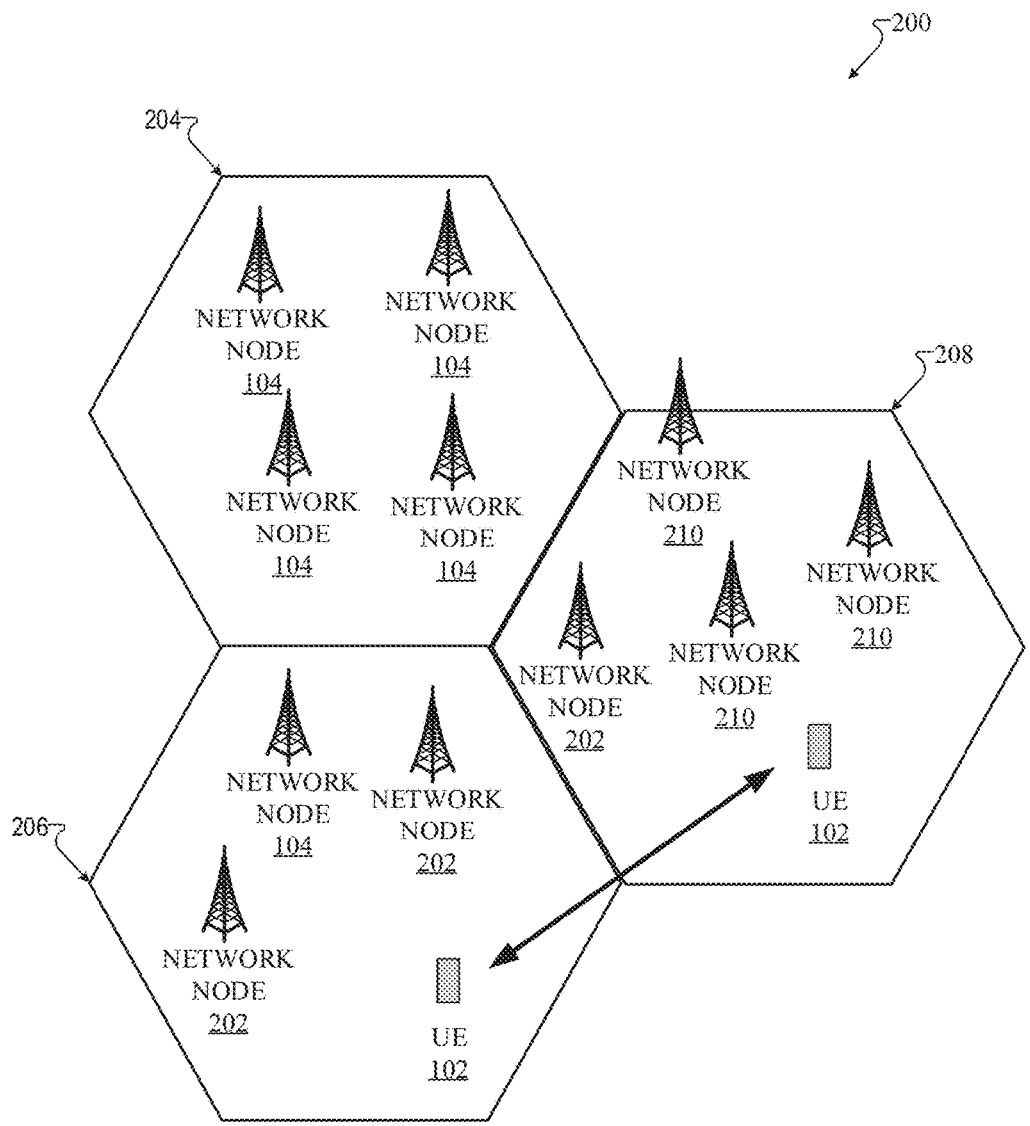
FIG. 2 illustrates an example schematic system block diagram of a mobile device transitioning between tracking areas according to one or more embodiments.

Referring now to FIG. 2, illustrated is an example schematic system block diagram 200 of a mobile device (e.g., 102 UE) transitioning between tracking areas (e.g., sectors, etc.) 206, 208 according to one or more embodiments. The system block diagram 200 can comprise several tracking areas 204, 206, 208, based on geographic location, wherein the tracking areas 204, 206, 208 can comprise network nodes 104, 202, 210 (e.g., cells). Each tracking area 204, 206, 208 can be defined as a type of tracking area. The network nodes 104, 202, 210 can be LTE cells type-0 (e.g., network node 104), LTE cells type-1 (e.g., network node 202), or LTE-A cells type-2 (e.g., network node 210). In one embodiment, the tracking areas can be defined based on the predominant cells within each tracking area. For example, the tracking area 204 can be defined as a type-0 tracking area because the tracking area 204 comprises LTE cells type-0 (e.g., network node 104), the tracking area 206 can be defined as a type-1 tracking area because the tracking area 206 comprises more LTE cells type-1 (e.g., network nodes 202) than LTE cells type-0 (e.g., network nodes 104), and the tracking area 208 can be defined as a LTE-A type-2 tracking area because the tracking area 208 comprises more LTE-A cells (e.g., network nodes 210) than LTE cells type-1 (e.g., network nodes 202) or LTE cells type-0 (e.g., network nodes 104). The mobile device (e.g., 102 UE) can also be defined by the types of services the mobile device (e.g., 102 UE) is capable of exploiting. For example, if the mobile device (e.g., 102 UE) cannot utilize LTE-A services, then the mobile device (e.g., 102 UE) can be defined as a type-0 mobile device (e.g., 102 UE), if the mobile device (e.g., 102 UE) can only utilize partial (e.g., a subset of) LTE-A services, then the mobile device (e.g., 102 UE) can be defined as a type-1 mobile device (e.g., 102 UE), and if the mobile device (e.g., 102 UE) can utilize full LTE-A services, then the mobile device (e.g., 102 UE) can be defined as a type-2 mobile device (e.g., 102 UE).

As the mobile device (e.g., UE 102) transitions from the tracking area 206 to the tracking area 208 or vice versa, the mobile device display screen can reflect the services for which the mobile device (e.g., UE 102) can partake accordingly. For example, if the mobile device (e.g., UE 102) is a type-0 mobile device (e.g., UE 102), then the mobile device (e.g., UE 102) can display LTE within all the tracking areas 204, 206, 208. However, if the mobile device (e.g., UE 102) is a type-1 mobile device (e.g., UE 102), then the mobile device (e.g., UE 102) can display an LTE-A icon in tracking area 206 because the mobile device (e.g., UE 102) can partake of the partial advanced services of the tracking area 206. The mobile device (e.g., UE 102) can then display LTE as it transitions to the tracking area 208 because the mobile device (e.g., UE 102) is only capable of partaking in partial LTE-A services of the type-2 tracking area 208. It should be noted that other characters or icons can be displayed on the display screen of the type-1 mobile device (e.g., UE 102) to indicate that the type-1 mobile device (e.g., UE 102) only has partial access to LTE-A services when the type-1 mobile device (e.g., UE 102) is within the type-2 tracking area 208. For example, the type-1 mobile device (e.g., UE 102) can display "LTE-PA" to indicate partial advanced service availability. Alternatively, if the mobile device (e.g., UE 102) was a type-2 mobile device (e.g., UE 102), then the mobile device (e.g., UE 102) display screen can display LTE-A within the tracking area 206 and within the tracking area 208 to indicate that all of the advanced services that are provided by the tracking areas 206, 208 are available to the mobile device (e.g., UE 102).

However, if the mobile device (e.g., UE 102) begins to transition to the tracking area 204 from the tracking areas 206, 208, the mobile device (e.g., UE 102) display screen can transition from an LTE-A icon to an LTE icon because the tracking area 204 does not offer LTE-A services. In alternate embodiments, a type-0 mobile device (e.g., UE 102) that does not have LTE-A capabilities, cannot display an LTE-A icon even if the mobile device (e.g., UE 102) is in an LTE-A tracking area (e.g., tracking area 208) or a partial LTE-A tracking area (e.g., tracking area 206). It should also be noted that the principles disclosed herein can also be applied to 5G (e.g., 5G type-0: first rollout version, 5G type-1: partial "advanced" features, 5G type-2: fully "advanced" features).

Figure 3:
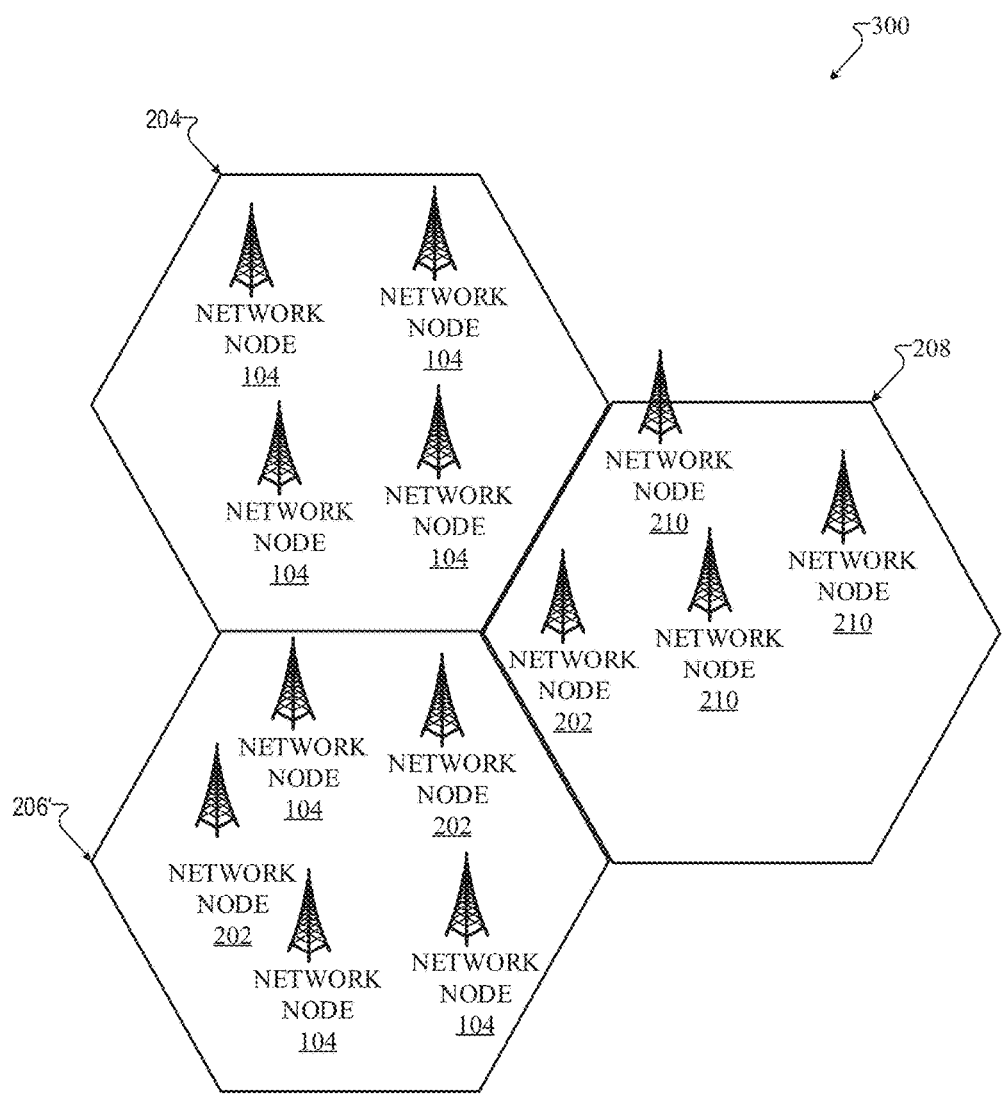
FIG. 3 illustrates an example schematic system block diagram of a tracking area type modification based on additional cell sites.

Referring now to FIG. 3, illustrated is an example schematic system block diagram 300 of a tracking area type modification based on additional cell sites. FIG. 3 depicts a modified tracking area 206' in reference to the tracking area 206 of FIG. 2. The types of the tracking areas can be modified based on a number of cells, a population, etc. For example, FIG. 3's tracking area 206' comprises more network nodes than FIG. 2's tracking area 206. More specifically, FIG. 3's tracking area 206' comprises more LTE cells type-0 (e.g., network node 104) than FIG. 2's tracking area 206. Consequently, as depicted in FIG. 3, the network nodes 104 now outnumber the network nodes 202 as shown in FIG. 2. Because the network nodes 104 now outnumber the network nodes 202, the overall tracking area 206 can now be defined as an LTE cell type-0 tracking area. Thus, any mobile device (e.g., UE 102) in the tracking area 206' of FIG. 3 can display LTE instead of displaying LTE-A as with the tracking area 206 of FIG. 2.

Figure 4:
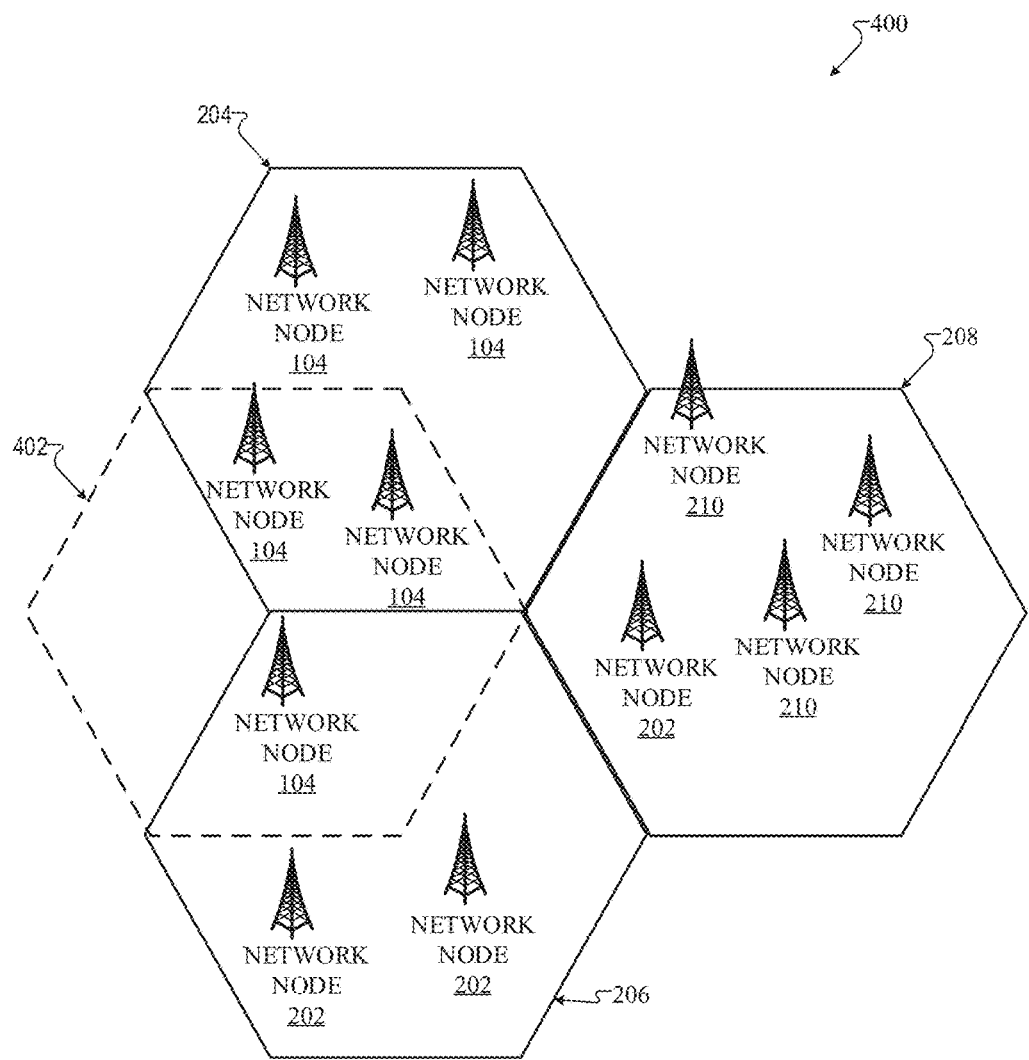
FIG. 4 illustrates an example schematic system block diagram of a geographic change for a tracking area.

Referring now to FIG. 4, illustrated is an example schematic system block diagram 400 of a geographic change for a tracking area. It should also be noted that the geographic areas of the tracking areas can also be modified. For example, one tracking area can be split into multiple tracking areas based on a smaller density of cells. FIG. 4 depicts a modification by which some of the LTE cells type-0 (e.g., network node 104) of the tracking area 204 and the tracking area 206 are comprised within a new tracking area 402. Because the tracking area 402 is composed of only LTE cells type-0 (e.g., network node 104), the tracking area 402 cannot offer any LTE-A services. However, it should be noted that this type of redistricting can be performed for any of the other tracking areas as well (e.g., tracking area 208; tracking areas 204, 208; tracking areas 204, 206, 208; tracking areas 206, 208, etc.).

Figure 5:
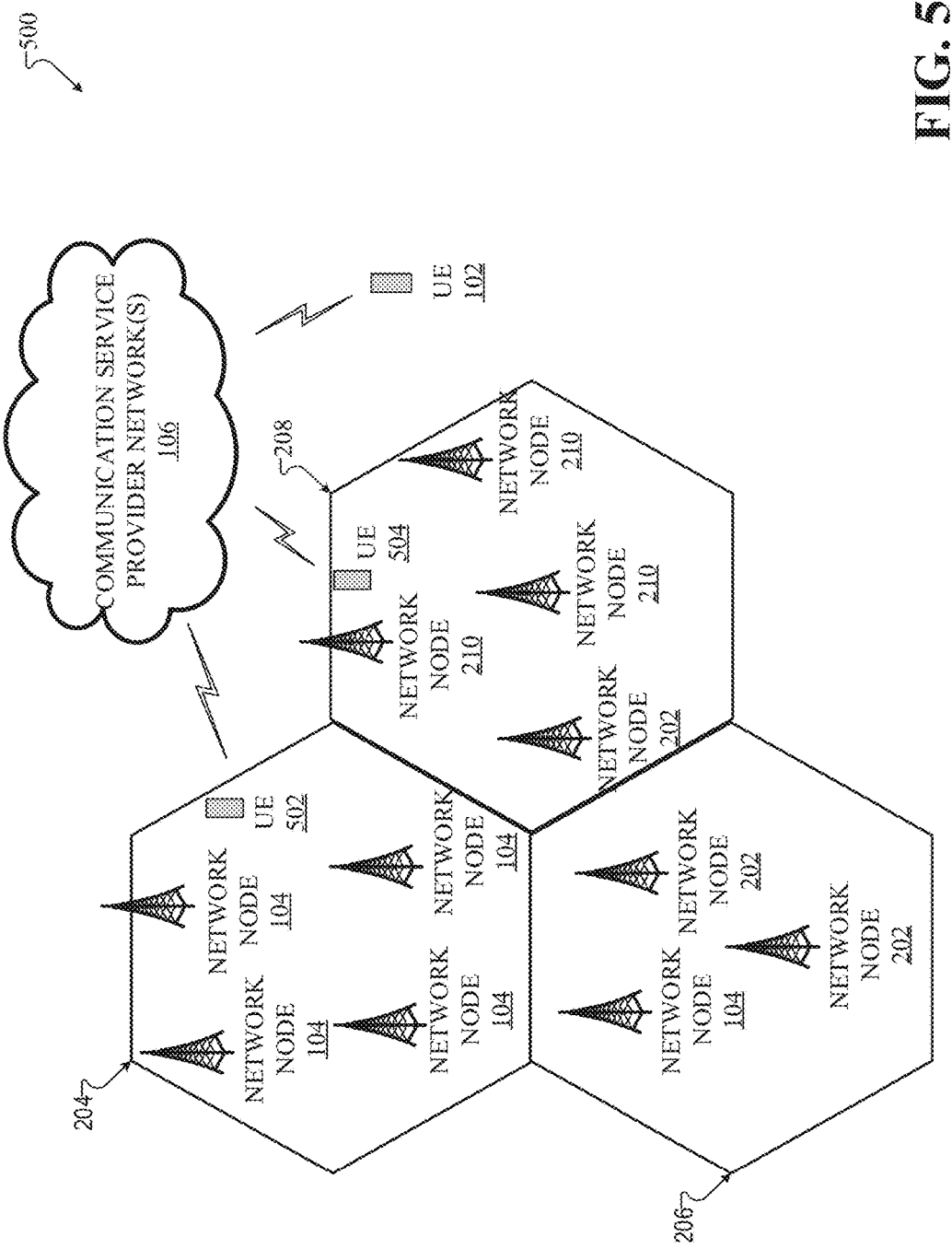
FIG. 5 illustrates an example schematic system block diagram of a crowd sourcing function according to one or more embodiments.

Referring now to FIG. 5, illustrated is an example schematic system block diagram 500 of a crowd sourcing function according to one or more embodiments. In an alternate embodiment, the system block diagram 500 can comprise the same tracking areas 204, 206, 208 and the same network nodes 104, 202, 210. However, a crowdsourcing feature can allow the data obtained by one or more mobile devices (e.g., UE 502, 504) to be shared with another mobile device (e.g., UE 102). For example, the UEs 502, 504 can already have data indicative that the tracking areas 204, 208 are type-0 and type-2, respectively, because the UEs 502, 504 have entered these tracking areas 204, 208. This data can then be sent to server devices of the communication service provider network 106. The data can then be sent from the server devices to the UE 102 so that the UE 102 can have data regarding whether the tracking areas 204, 208 comprise primarily LTE or LTE-A network nodes 104, 210, respectively. Thus, an LTE-A service area list can be updated and then transmitted to the UE 102 via the aforementioned crowdsourcing scenario. Furthermore, because the tracking area 208 comprises mostly LTE-A cells type-2 (e.g., network node 210), even though the tracking area has a network node 202 (LTE type-1 cell), the entire tracking area 208 can still be considered to be an advanced services tracking area because it mainly comprises network nodes 210 that support advanced services.

Figure 6:
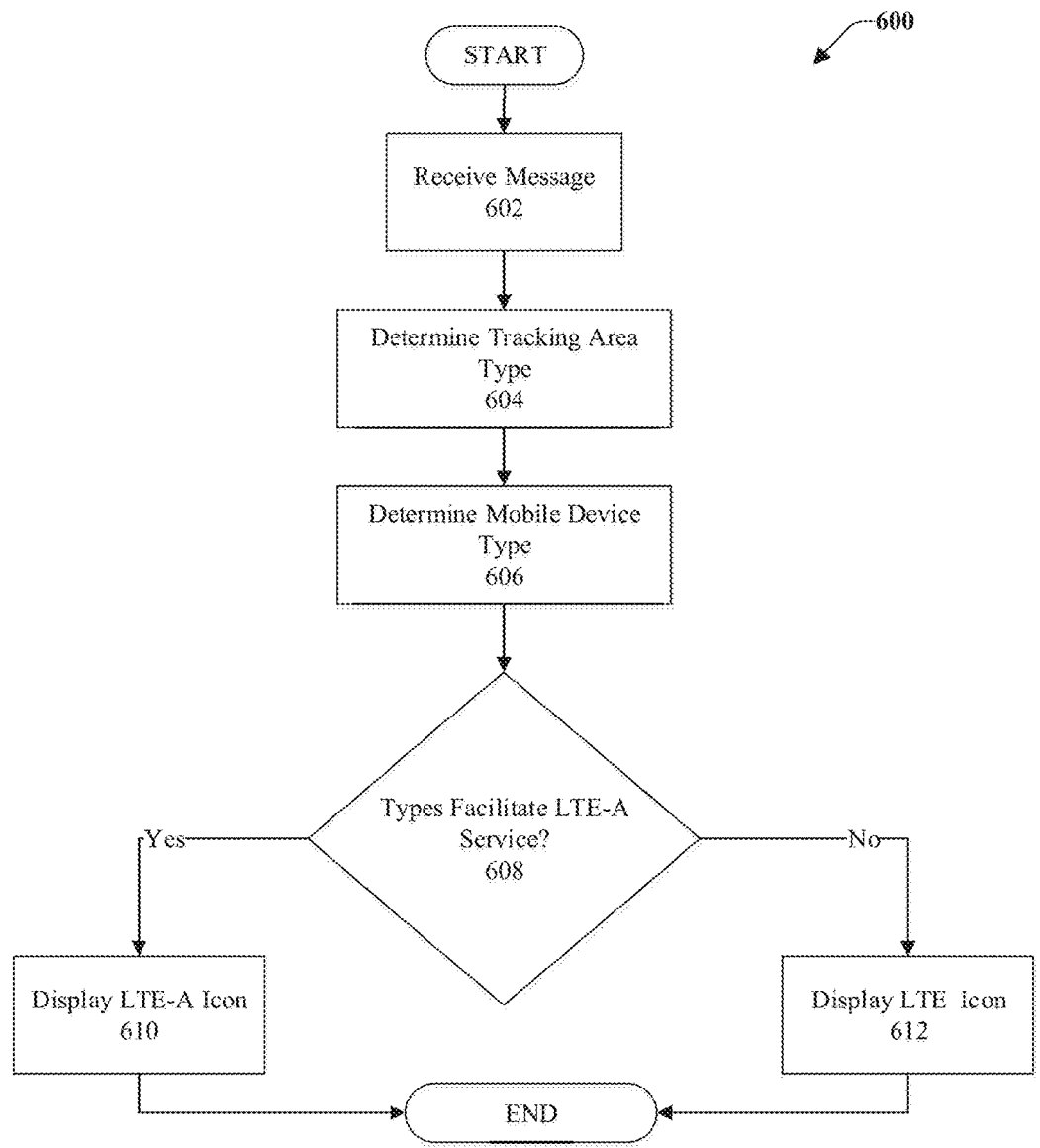
FIG. 6 illustrates an example flow diagram for a mobile device icon selection process according to one or more embodiments.

Referring now to FIG. 6, illustrated is an example flow diagram 600 for a mobile device icon selection process according to one or more embodiments. As deployment progresses and the LTE-A service area expands, an updated LTE-A service system can be used. To facilitate this process, the mobile device (e.g. UE 102) can receive a message at block 602 from the communication service provider network 106. Based on the message, the mobile device (e.g., UE 102) can determine the tracking area type (e.g., type-0, type-1, type-2) associated with a geographic area the mobile device (e.g., UE 102) has entered, or is about to enter, at block 604. The mobile device (e.g., UE 102) and/or the system can next determine and/or verify the type of mobile device (e.g., type-0, type-1, type-2) at block 606. At decision point block 608, if various tracking area types and device types can facilitate LTE-A services (e.g., tracking area type-1 and mobile device type-1, or tracking area type-1 and mobile device type-2, etc.), then the mobile device (e.g., UE 102) can display an LTE-A icon at block 610. However, if the tracking area types and device types cannot facilitate LTE-A services (e.g., tracking area type-0 and mobile device type-0, tracking area type 0 and mobile device type-1, tracking area type-0 and mobile device type-2, or tracking area type 1 and mobile device type-0), then the mobile device (e.g., UE 102) can display an LTE icon at block 612.

Figure 7:
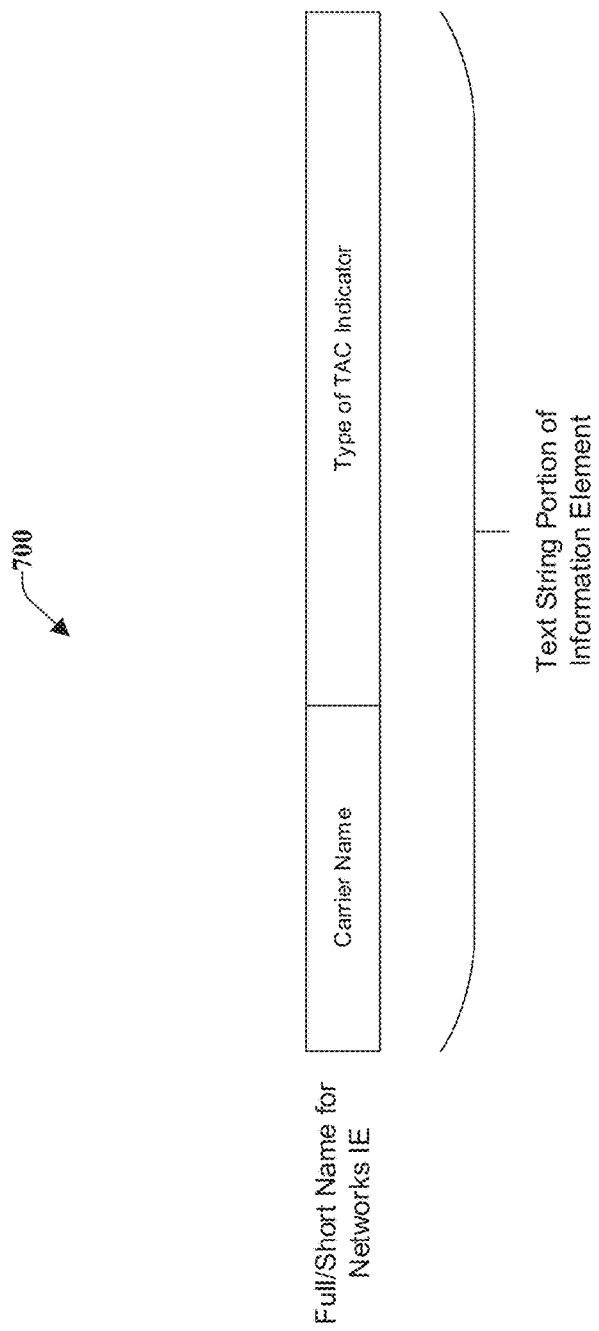
FIG. 7 illustrates an example block diagram of a text string field depicting a separation of carrier name and a type of tracking area code indicator according to one or more embodiments.

Referring now to FIG. 7 illustrates an example block diagram 700 of a text string field depicting a separation of carrier name and a type of tracking area code indicator according to one or more embodiments. To indicate the type of the tracking area that the mobile device (e.g., UE 102) can encounter, a "type of TAC indicator" can be appended to the "carrier name" within the text string field of the full/short name for network information elements as shown in Tables 1-3. In another embodiment, the text string can be a name that can be sent to the mobile device (e.g., UE 102) as message data, and the name can be embedded with the type of the tracking area. The mobile device (e.g., UE 102) can identify a defined character pattern from the received text string, wherein the defined character pattern can be indicative of the type of the tracking area. Thus, the mobile device (e.g., UE 102) can parse the message data to determine the type of the tracking area based on a recognized pattern within the text string. For example, the text string can be "ATT", however with the tracking area indicator, the message can be "ATTXXX", wherein the XXX is the tracking area indicator. It should be noted that the nomenclature can be any recognizable pattern (e.g., 3 spaces and a 1 at the end of the name to represent a type-3 tracking area, 3 spaces and a 2 to represent a type-2 tracking area, 1 space to represent a type-1 tracking area, 2 spaces to represent a type-2 tracking area, etc.).

Figure 8:
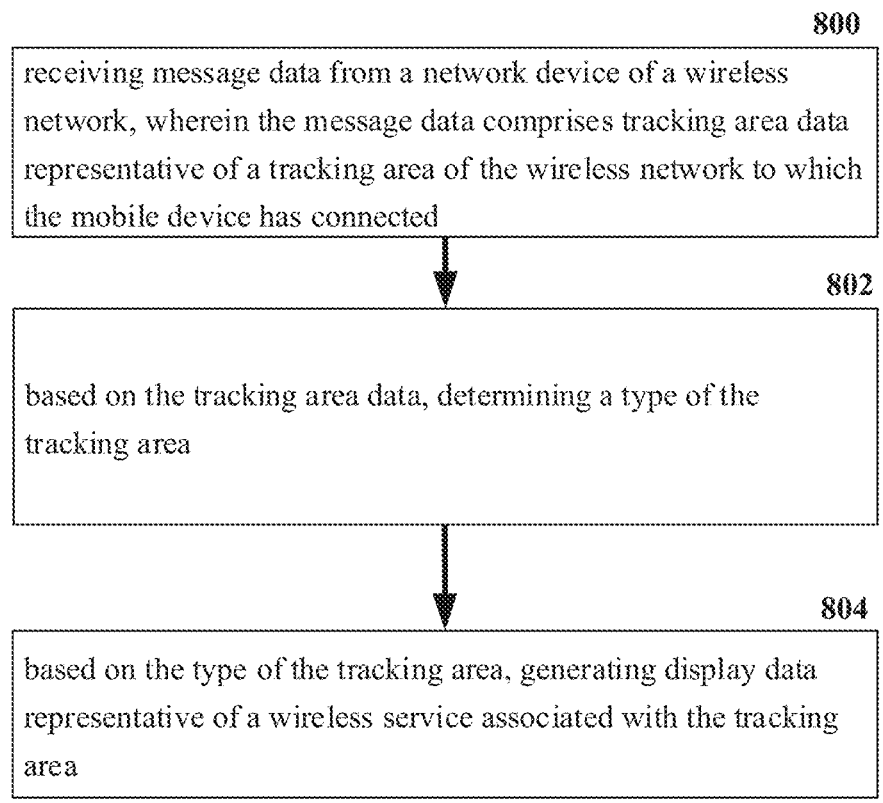
FIG. 8 illustrates an example flow diagram for a method for an advanced function indicator for an LTE network according to one or more embodiments.

Referring now to FIG. 8, illustrated an example flow diagram for a method for an advanced function indicator for an LTE network according to one or more embodiments. At element 800, the method can comprise receiving message data (e.g., UE 102) from a network device of a wireless network, wherein the message data comprises tracking area data representative of a tracking area (e.g., type-0, type-1, type-2) of the wireless network to which the mobile device (e.g., UE 102) has connected. For example, a mobile device (e.g., UE 102) can receive a message that comprises data representative of a type-2 tracking area 208. Based on the tracking area data, the method can comprise determining (e.g., via the UE 102) a type of the tracking area at element 802. Additionally, based on the type of the tracking area, at element 804, the method can comprise generating (e.g., via UE 102) display data representative of a wireless service (e.g., LTE, LTE-A, etc.) associated with the tracking area 204, 206, 208. Thus, if the mobile device (e.g., UE 102) is an LTE-A capable mobile device (e.g., UE 102) (e.g., type-2 mobile device), then the mobile device (e.g., UE 102) can generate and display an LTE-A icon to represent that the mobile device (e.g., UE 102) has access to LTE-A services provided by the type-2 tracking area 208.

Figure 9:
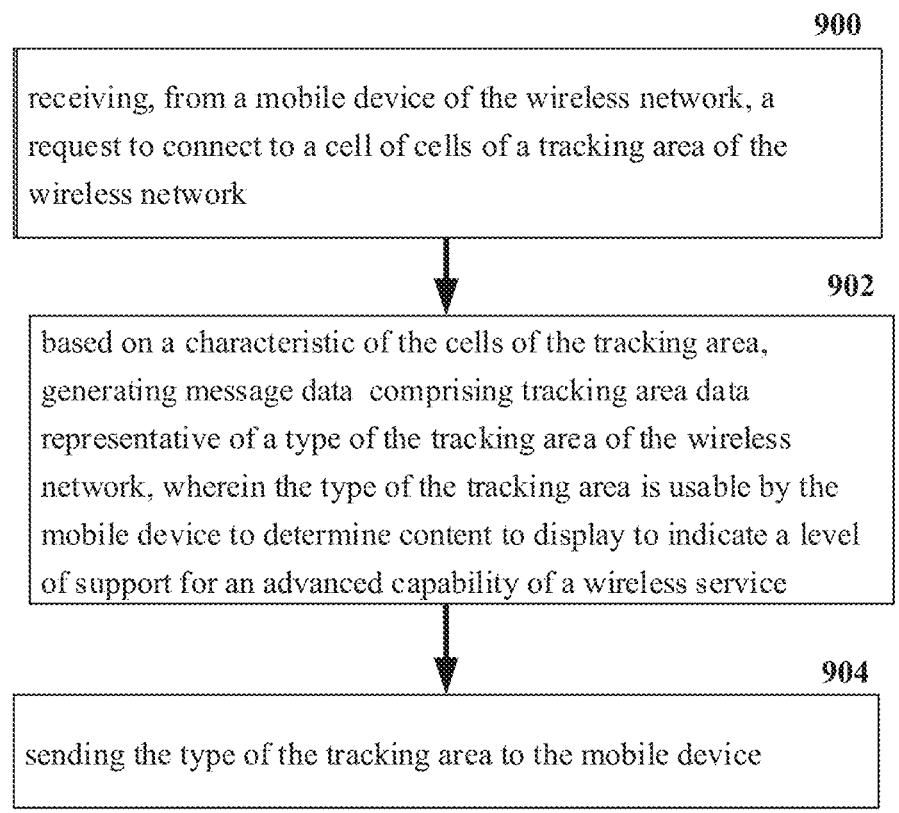
FIG. 9 illustrates an example flow diagram for a network device to facilitate displaying an advanced function indicator for an LTE network according to one or more embodiments.

Referring now to FIG. 9, illustrated is an example flow diagram for a network device to facilitate displaying an advanced function indicator for an LTE network according to one or more embodiments. At element 900, a network device can receive, from a mobile device (e.g., UE 102) of the wireless network (e.g., communication service provider network 106), a request to connect to a cell of cells of a tracking area of the wireless network. At element 902, based on a characteristic of the cells of the tracking area 204, 206, 208, the network device can generate message data comprising tracking area data representative of a type of the tracking area 204, 206, 208 of the wireless network (e.g., communication service provider network 106), wherein the type of the tracking area 204, 206, 208 is usable by the mobile device (e.g., UE 102) to determine content to display to indicate a level of support for an advanced capability of a wireless service. For example, the message data can comprise an indication that the mobile device (e.g., UE 102) is within a type-1 tracking area. The network device can send the type of the tracking area to the mobile device (e.g., UE 102). For example, the system can facilitate the mobile device (e.g., UE 102) displaying "LTE" because the mobile device (e.g., UE 102) is a type-0 mobile device (e.g., UE 102). Thus, regardless of the tracking area type, the mobile device (e.g., UE 102) can display "LTE" in this specific scenario.

Figure 10:
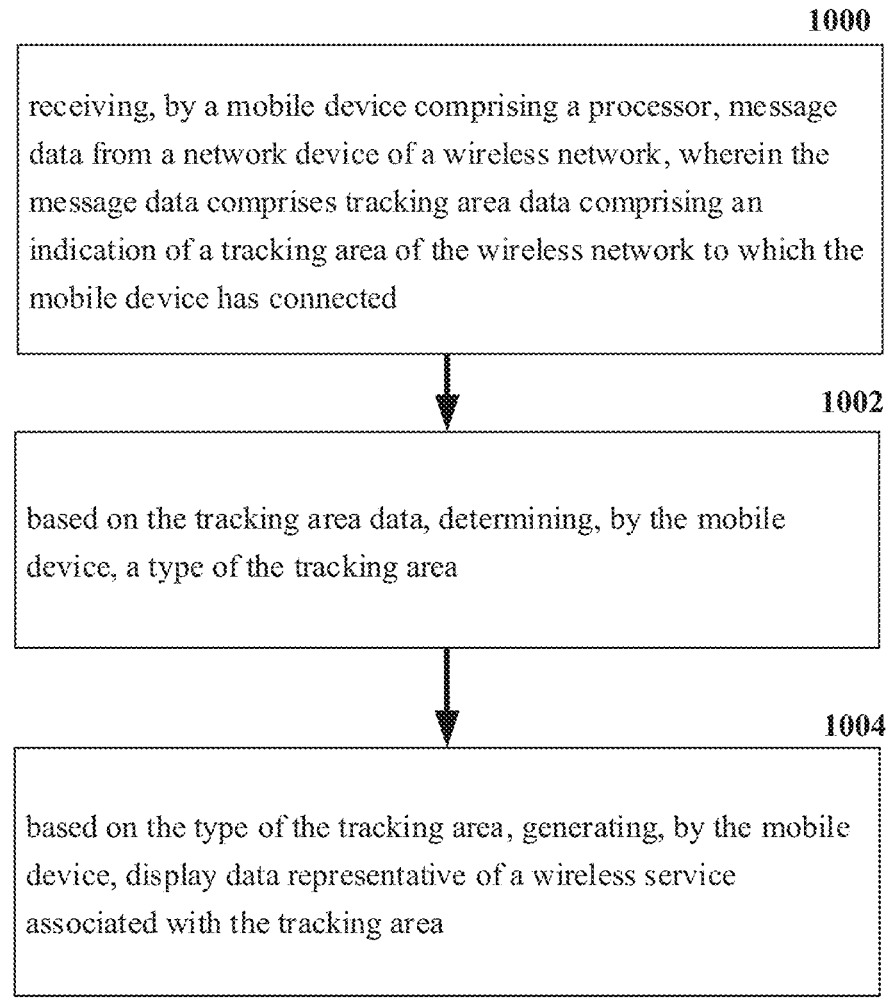
FIG. 10 illustrates an example flow diagram for a machine-readable medium for an advanced function indicator for an LTE network according to one or more embodiments.

Referring now to FIG. 10, illustrated is an example flow diagram for a machine-readable medium for an advanced function indicator for an LTE network according to one or more embodiments. At element 1000, a machine-readable storage medium can comprise receiving (e.g., by UE 102) message data from a network device (e.g., network nodes 104, 202, 210) of a wireless network (e.g., communication service provider network 106), wherein the message data comprises tracking area data comprising an indication of a tracking area 202, 204, 206 of the wireless network (e.g., communication service provider network 106) to which the mobile device (e.g., UE 102) has connected. For example, the mobile device (e.g., UE 102) can receive an indication that the mobile device (e.g., UE 102) is within a type-1 tracking area 206 mainly comprised of network nodes 202. At element 1002, based on the tracking area data, the machine-readable storage medium can comprise determining (e.g., by UE 102) a type of the tracking area.

Additionally, at element 1004, based on the type of the tracking area, the machine-readable storage medium can comprise generating (e.g., by UE 102) display data representative of a wireless service associated with the tracking area 202, 204, 206. For example, if the mobile device (e.g., UE 102) is a type-1 mobile device (e.g., UE 102) and the tracking area 206 is a type-1 tracking area, then the machine-readable medium can facilitate the mobile device (e.g., UE 102) displaying "LTE-A" because the mobile device (e.g., UE 102) is a type-1 mobile device (e.g., UE 102) and the tracking area is a type-1 tracking area. Thus, the mobile device (e.g., UE 102) is privy to a subset of LTE-A services while in the type-1 tracking area 206 and can display "LTE-A" in this specific scenario.

Figure 11:
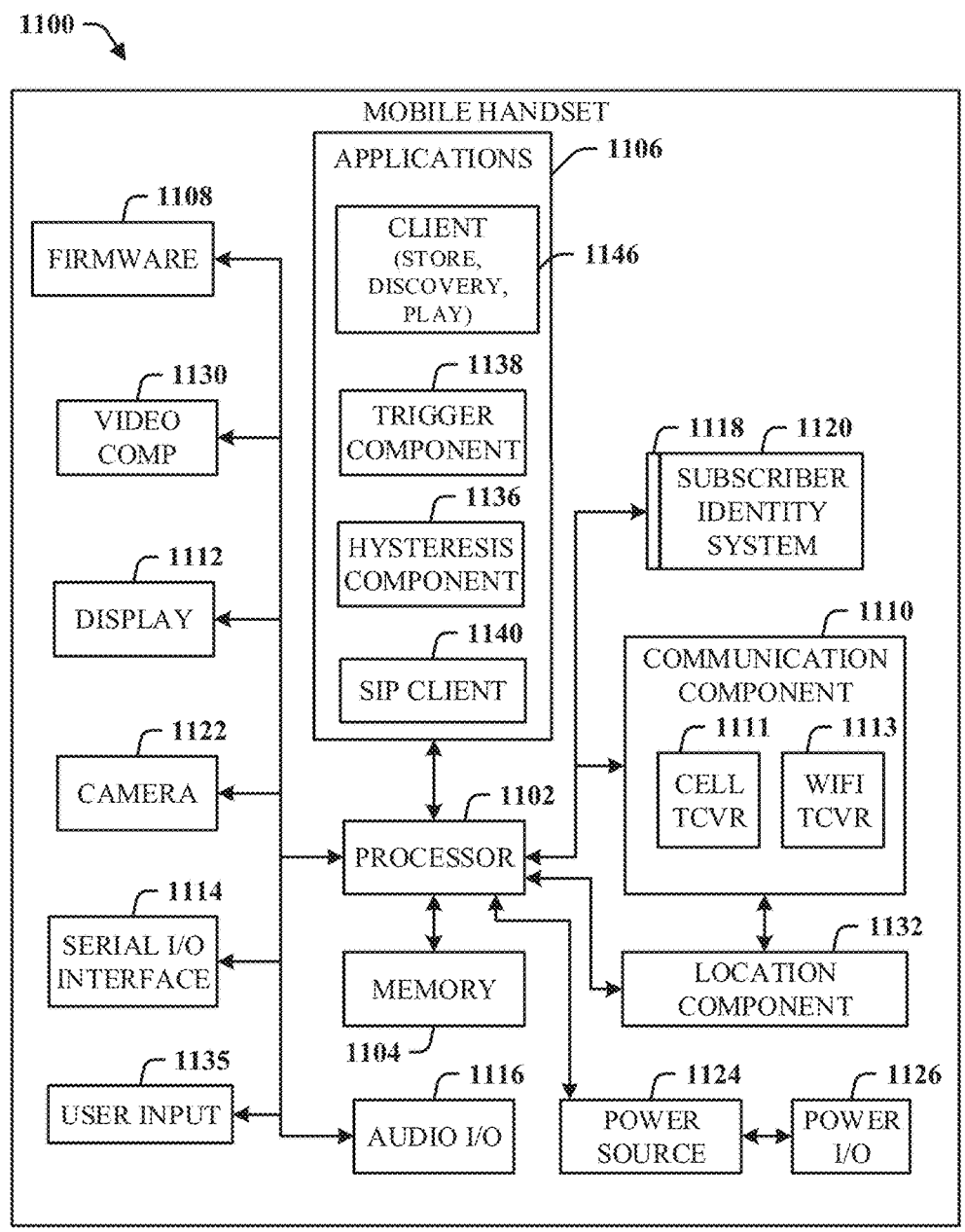
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile handset 1100 capable of connecting to a network in accordance with some embodiments described herein. Although the mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment for the mobile handset 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The mobile handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the mobile handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The mobile handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The mobile handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the mobile handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The mobile handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the mobile handset 1100, and updated by downloading data and software.

The mobile handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the mobile handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The mobile handset 1100 also includes a power source 1124 in the form of batteries and/or an AC power subsystem, which power source 1124 can interface to an external power system or charging equipment (not shown) by a power I/O component 1126.

The mobile handset 1100 can also include a video component 1130 for processing video content received and, for recording and transmitting video content. For example, the video component 1130 can facilitate the generation, editing and sharing of video quotes. A location tracking component 1132 facilitates geographically locating the mobile handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The mobile handset 1100, as indicated above related to the communications component 1110, includes an indoor network radio transceiver 1113 (e.g., Wi-Fi transceiver). This function supports the indoor radio link, such as IEEE 802.11, for the dual-mode GSM mobile handset 1100. The mobile handset 1100 can accommodate at least satellite radio services through a handset that can combine wireless voice and digital radio chipsets into a single handheld device.

Figure 12:
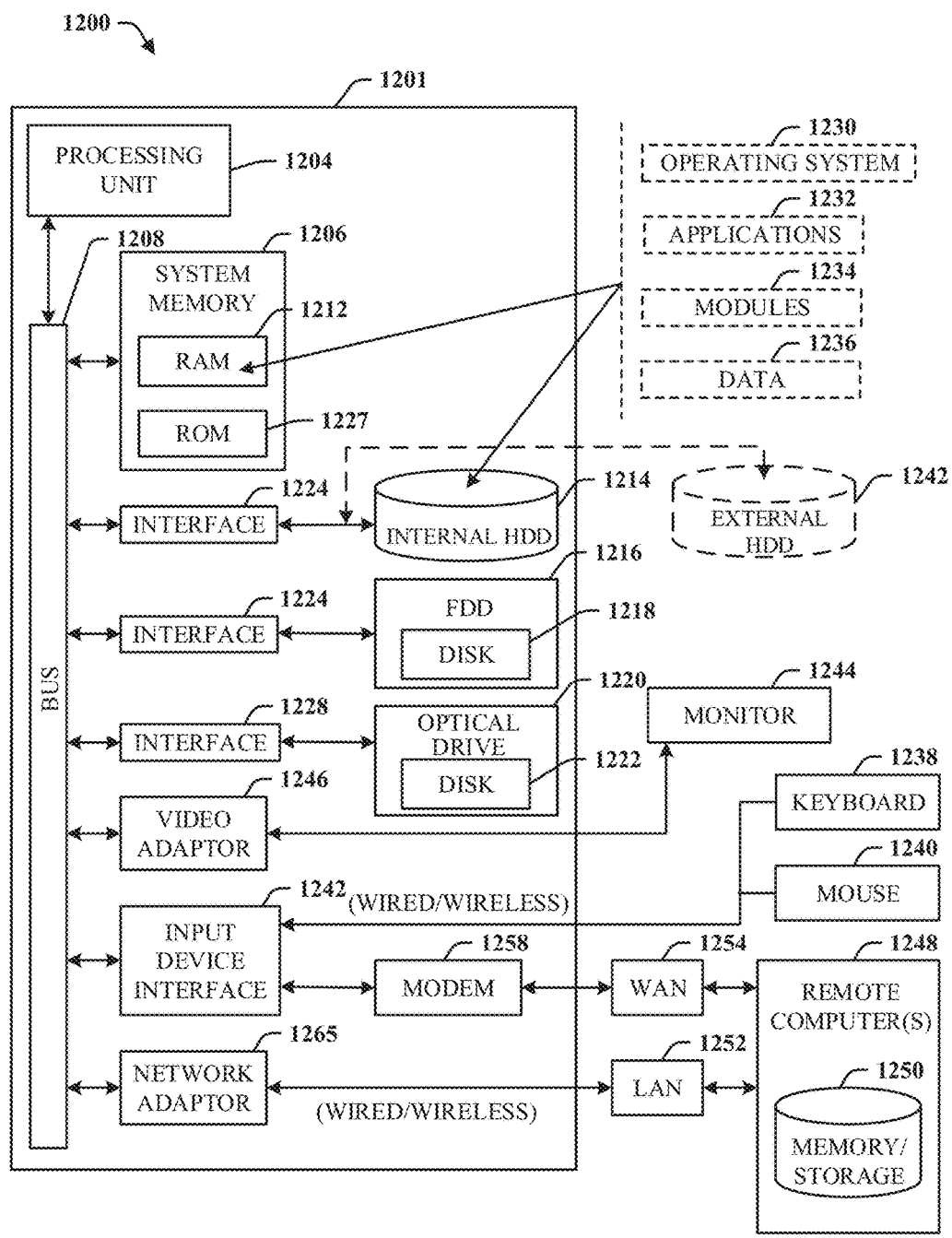
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

This disclosure allows the carrier to control which feature to include in the list of applicable features. As deployment progresses, the carrier can include the type of TAC indicator in more tracking areas, thereby indicating an expanding service area, which is an improvement over the current technology. The carrier can control which devices to enable the icon on by examining the support of the applicable features. The carrier can also have the ability to control which icon to display based on a geographic location.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a mobile device comprising a processor, message data from a network device of a wireless network, wherein the message data comprises tracking area data representative of a tracking area of the wireless network to which the mobile device has connected;
   sending, by the mobile device, a request to connect to a cell of cells of the tracking area of the wireless network, wherein the sending the request to connect comprises sending identification information identifying the mobile device to the network device;
   based on the tracking area data, determining, by the mobile device, a type of the tracking area;
   based on the type of the tracking area, generating, by the mobile device, display data representative of a wireless service associated with the tracking area; and
   based on the identification information, facilitating, by the mobile device, determining capability data representative of a capability of the mobile device to utilize the wireless service associated with the tracking area, wherein the identification information comprises an international mobile subscriber identity number, and wherein the message data comprises the type of the tracking area based on a characteristic of the mobile device determined from the international mobile subscriber identity number.

2. The method of claim 1, further comprising:
   prior to the determining the type of the tracking area, receiving, by the mobile device, tracking area type information comprising a tracking area criterion applicable to classify tracking areas of the wireless network, and wherein the tracking area criterion is used to determine, as a function of types of tracking areas and device capability, what to display for the tracking areas of the wireless network,
   wherein the generating the display data based on the type of the tracking area comprises evaluating the tracking area criterion with respect to the type of the tracking area and the capability of the mobile device to determine the display data.

3. The method of claim 2, wherein the tracking area criterion is configurable by the network device to at least one of remove the tracking criterion, to modify the tracking area criterion, or to include an additional tracking area criterion, with respect to at least one of a first percentage, a first density or a first number of cells distributing the wireless service in the tracking area, or a second percentage, a second density or a second number of the cells distributing the wireless service comprising an advanced capability to provide the wireless service relative to other ones of the cells.

4. The method of claim 2, wherein the tracking area criterion is configurable by the network device to at least one of remove the tracking area criterion, to modify the tracking area criterion, or to include an additional tracking area criterion, with respect to at least one of a size of a device population with the tracking area, a density of the device population, a bandwidth associated with the device population, a latency associated with the device population, a geographical location of the tracking area, a type of traffic associated with the device population, an amount of interference associated with the device population, a quality of the wireless service applicable to the traffic associated with the device population, or a quality of a channel applicable to the traffic associated with the device population.

5. The method of claim 2, wherein the tracking area criterion is configurable by the network device to at least one of remove the tracking area criterion, to modify the tracking area criterion, or to include an additional tracking area criterion, with respect to a video processing capability of the mobile device, a data rate capability of the mobile device, a storage capability of the mobile device, a wireless communication standard dictated capability, or a subscription by the mobile device to home network service of the wireless network.

6. The method of claim 2, wherein the types of the tracking areas comprise at least three types, comprising a first type indicating a base level of support being provided for the wireless service of the wireless network without support for an advanced capability of the wireless service, a second type indicating partial support being provided for the advanced capability of the wireless service, and a third type indicating full support for the advanced capability of the wireless service.

7. The method of claim 1, wherein the receiving the message data comprises receiving the message data in response to the network device having determined that the mobile device has qualified to receive the type of the tracking area as part of a subscription to a home network service of the wireless network.

8. The method of claim 1, wherein the message data comprises name data representative of at least one of a name or an abbreviated name of the wireless network, and type data representative of the type of the tracking area, to facilitate identification of the type of the tracking area.

9. The method of claim 8, wherein the determining the type of the tracking area comprises identifying a defined character pattern indicative of the type of the tracking area in the message data.

10. The method of claim 1, wherein the display data comprises a long-term evolution advanced icon representative of an advanced wireless service associated with a long-term evolution network, and further comprising:
in response to the generating the display data, displaying, by the mobile device, the long-term evolution advanced icon via a screen of the mobile device.

11. The method of claim 1, further comprising:
based on the type of the tracking area being determined to be a default type of tracking area, displaying, by the mobile device, a default icon representative of a default wireless service of the tracking area.

12. The method of claim 1, wherein the receiving the message data comprises receiving the message data during an idle mode of operation of the mobile device comprising receiving the message data during at least one of an attach operation to the wireless network by the mobile device, a tracking area update operation by the mobile device to update the tracking area to which the mobile device is connected, or a handover operation by the mobile device.

13. A network device of a wireless network, comprising:
a processor; and
a memory that stores executable instructions that, when executed by the processor, facilitate performance of operations, comprising:
receiving, from a mobile device of the wireless network, a request to connect to a cell of cells of a tracking area of the wireless network, wherein the receiving the request to connect comprises receiving identification information identifying the mobile device to the network device;
based on a first characteristic of the cells of the tracking area, generating message data comprising tracking area data representative of a type of the tracking area of the wireless network, wherein the type of the tracking area is usable by the mobile device to determine content to display to indicate a level of support for an advanced network capability of a wireless service;
based on the identification information, determining capability data representative of a capability of the mobile device to utilize the wireless service associated with the tracking area, wherein the identification information comprises an international mobile subscriber identity number, and wherein the generating the message data comprises generating the type of the tracking area based on a second characteristic of the mobile device determined from the international mobile subscriber identity number; and
sending the type of the tracking area to the mobile device.

14. The network device of claim 13, wherein the operations further comprise:
based on the tracking area data, determining the type of the tracking area, wherein the type of the tracking area is determined to be a default type of the tracking area.

15. The network device of claim 13, wherein the message data is first message data comprising first tracking area data representative of a first type of the tracking area, wherein the cells are first cells of the wireless network that enable a partial support for the advanced network capability, wherein the first type of the tracking area is usable by the mobile device to determine the content to display to indicate the partial support for the advanced capability of the wireless service, and wherein the operations further comprise:
in response to second cells being allocated to the tracking area in addition to the first cells, resulting in aggregated cells comprising the first cells and the second cells, modifying the tracking area data resulting in a modified tracking area comprising the aggregated cells, wherein the aggregated cells enable a full support for the advanced network capability, and
generating second message data comprising second tracking area data representative of a second type of the tracking area of the wireless network, wherein the second type of the tracking area is usable by the mobile device to determine the content to display to indicate the full support for the advanced capability of the wireless service.

16. The network device of claim 13, wherein the message data is first message data comprising first tracking area data representative of a first type of the tracking area, wherein the cells are first cells of the wireless network that do not enable support for the advanced network capability, wherein the first type of the tracking area is usable by the mobile device to determine the content to display to indicate a lack of the support for the advanced capability of the wireless service, and wherein the operations further comprise:

in response to second cells being allocated to the tracking area in addition to the first cells, resulting in aggregated cells comprising the first cells and the second cells, modifying the tracking area data resulting in a modified tracking area comprising the aggregated cells, wherein the aggregated cells enable a partial support for the advanced network capability, and generating second message data comprising second tracking area data representative of a second type of the tracking area of the wireless network, wherein the second type of the tracking area is usable by the mobile device to determine the content to display to indicate the partial support for the advanced capability of the wireless service.

17. The network device of claim 13, wherein the message data is first message data comprising first tracking area data representative of a first type of the tracking area, wherein the cells are first cells of the wireless network that enable a partial support for the advanced network capability and do not enable a full support for the advanced network capability, wherein the first type of the tracking area is usable by the mobile device to determine the content to display to indicate the partial support for the advanced capability of the wireless service, and wherein the operations further comprise:

in response to second cells of the first cells being removed from being allocated to the tracking area, resulting in third cells fewer than the first cells, modifying the tracking area data resulting in a modified tracking area comprising the third cells, wherein the third cells lack the full support and lack the partial support for the advanced network capability, and generating second message data comprising second tracking area data representative of a second type of the tracking area of the wireless network, wherein the second type of the tracking area is usable by the mobile device to determine the content to display to indicate the lack of the full support and the lack of the partial support for the advanced capability of the wireless service.

18. A non-transitory machine-readable storage medium, comprising executable instructions that, when executed by a processor, facilitate performance of operations, comprising:

receiving, by a mobile device comprising a processor, message data from a network device of a wireless network, wherein the message data comprises tracking area data comprising an indication of a tracking area of the wireless network to which the mobile device has connected;

based on the tracking area data, determining, by the mobile device, a type of the tracking area;

based on the type of the tracking area, generating, by the mobile device, display data representative of a wireless service associated with the tracking area;

sending, from the mobile device, a request to connect to a cell of cells of a tracking area of the wireless network, wherein the receiving the request to connect comprises receiving identification information identifying the mobile device to the network device; and based on the identification information, facilitating, by the mobile device, determining capability data representative of a capability of the mobile device to utilize the wireless service associated with the tracking area, wherein the identification information comprises an international mobile subscriber identity number, and wherein the generating the message data comprises generating the type of the tracking area based on a characteristic of the mobile device determined from the international mobile subscriber identity number.

19. The non-transitory machine-readable storage medium of claim 18, wherein the determining the type of the tracking area comprises mapping the indication of the tracking area received in the message data to the type of the tracking area using an updateable tracking area mapping data structure, stored in a storage device of the mobile device, that maps tracking areas of the wireless network to types of the tracking areas.

20. The non-transitory machine-readable storage medium of claim 19, wherein the operations further comprise:

receiving the updateable tracking area mapping data structure, and storing the updateable tracking area mapping data structure in a subscriber identity module of the mobile device.

\* \* \* \* \*